April 17, 1934. W. W. GALBREATH ET AL 1,955,491
ENAMELING APPARATUS
Filed Feb. 18, 1932 6 Sheets-Sheet 1
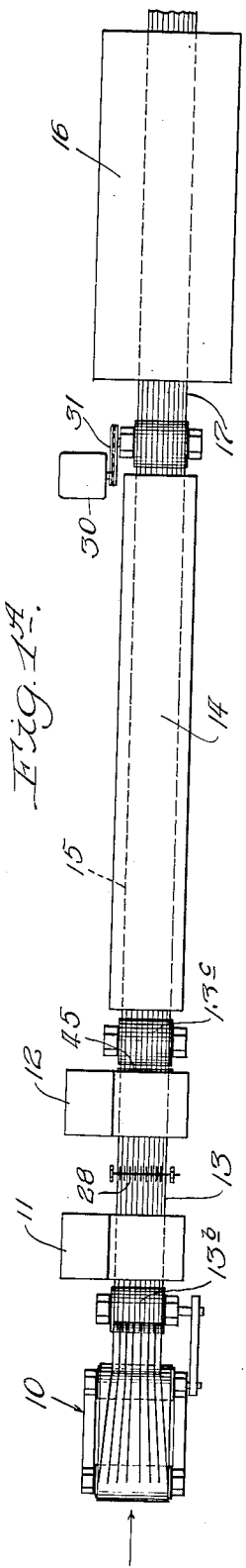
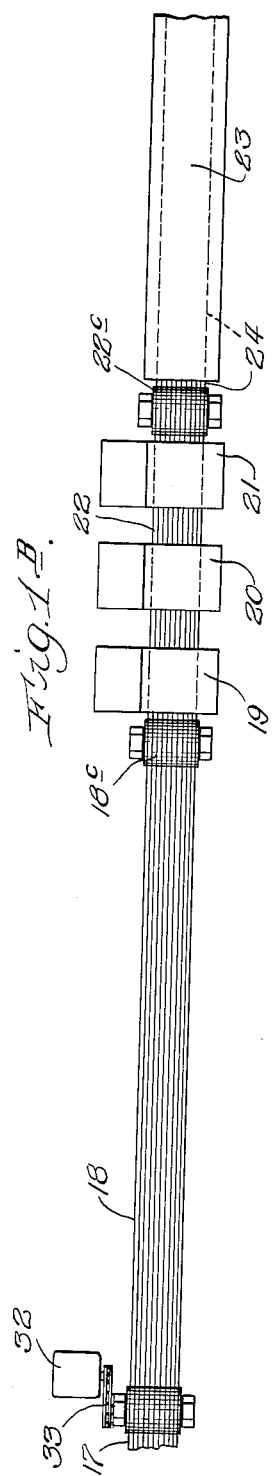
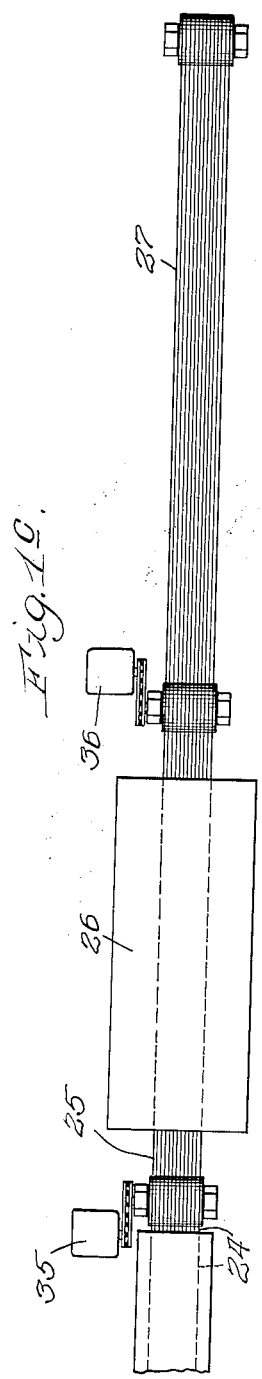
Inventors:
W. Wilson Galbreath,
Robert M. Chesney,
By Dynenforth, Lee, Chritton & Wiles,
Attys.

April 17, 1934.  W. W. GALBREATH ET AL  1,955,491
ENAMELING APPARATUS
Filed Feb. 18, 1932   6 Sheets-Sheet 2
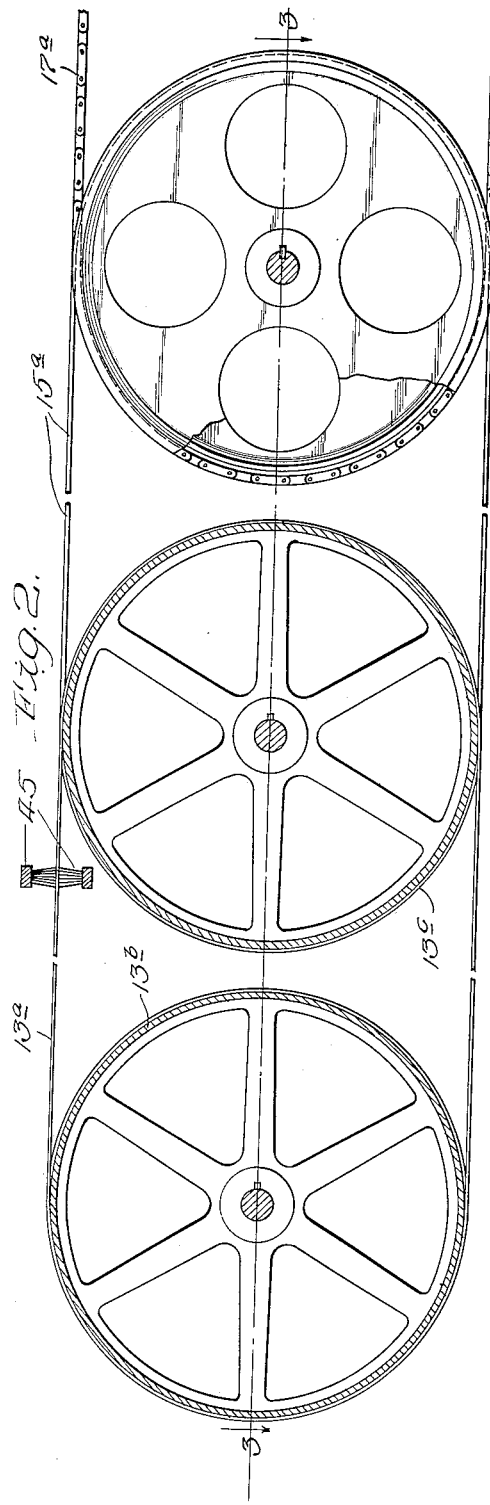
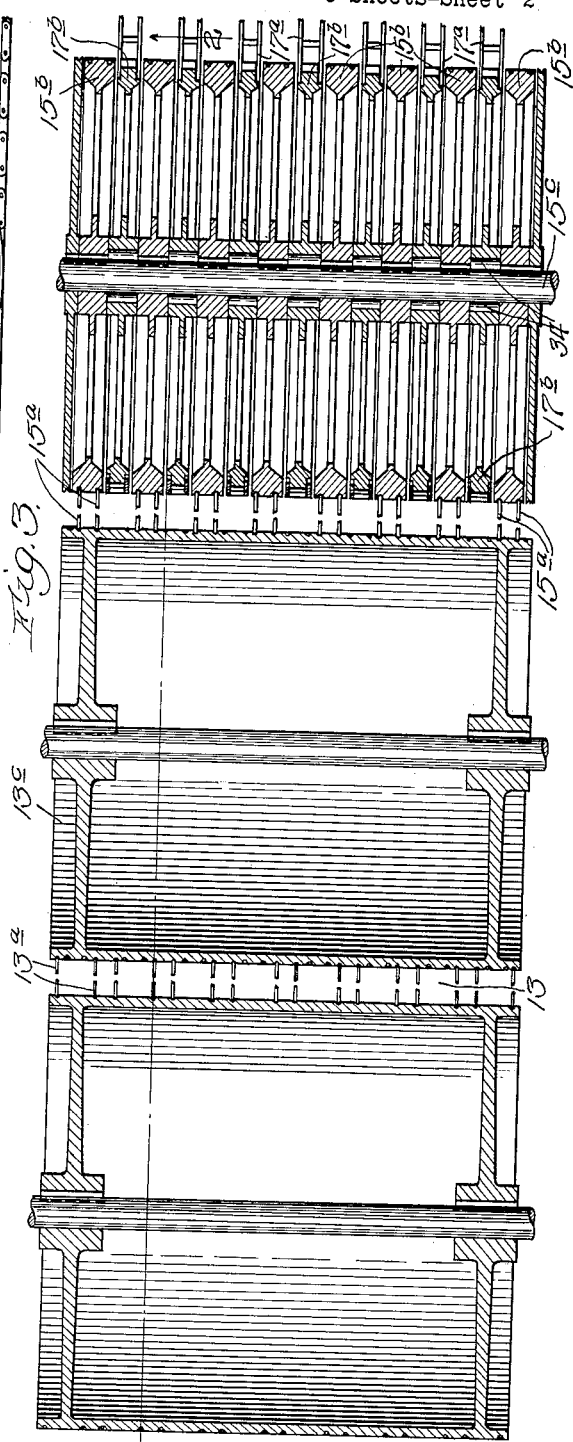

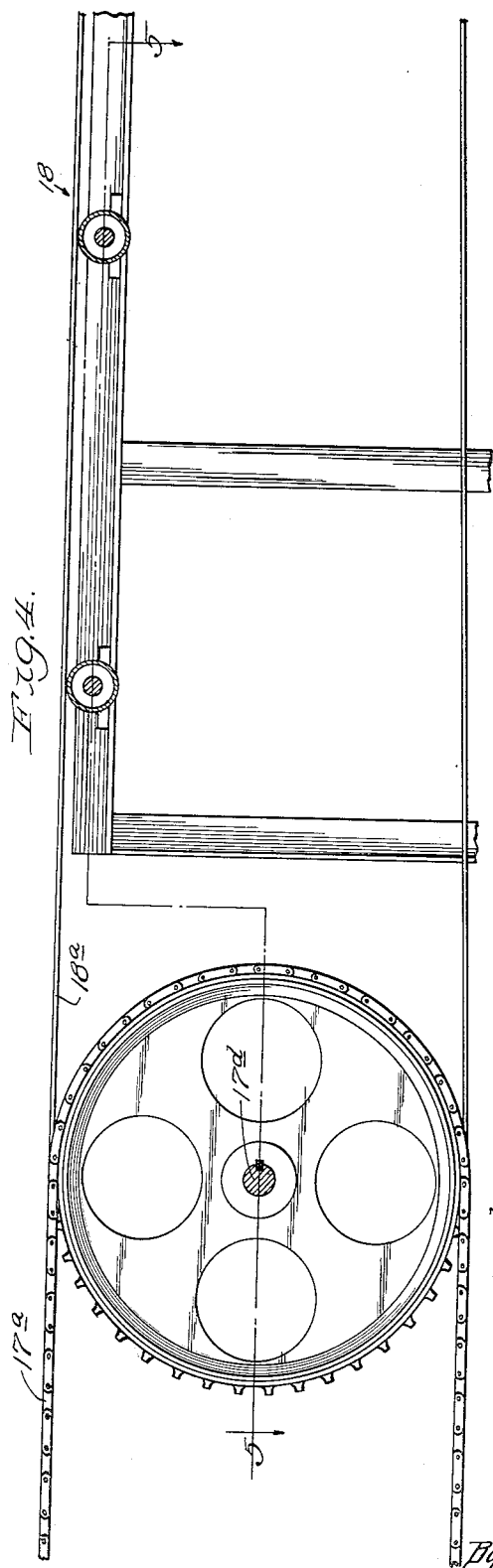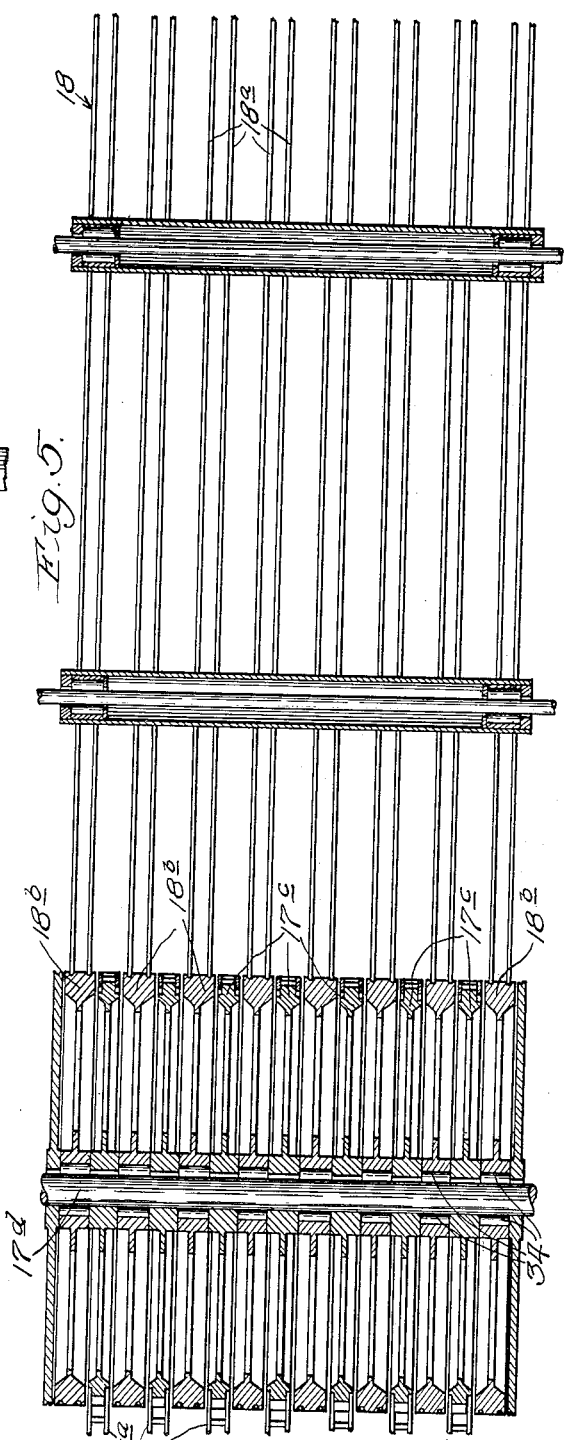

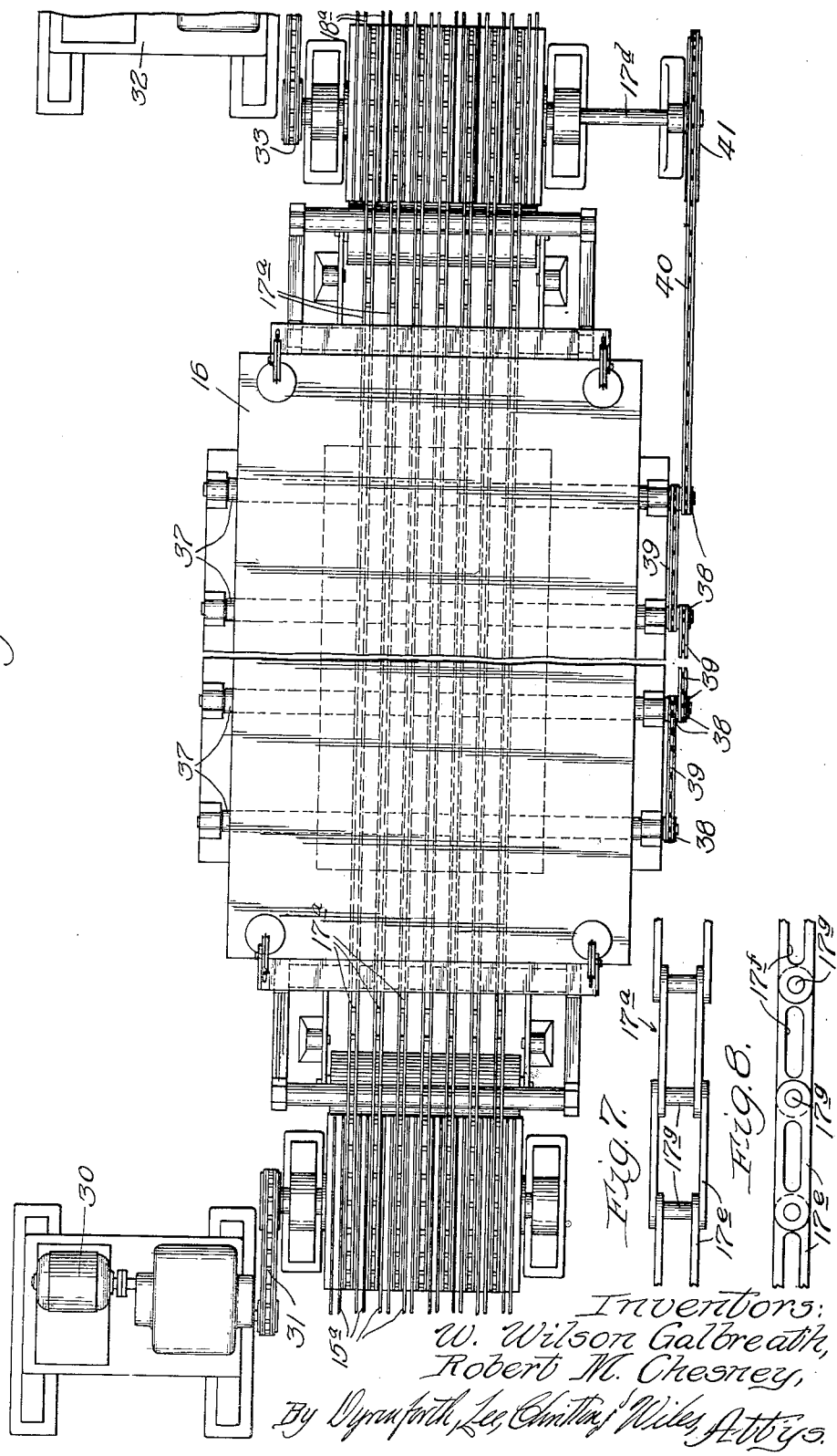

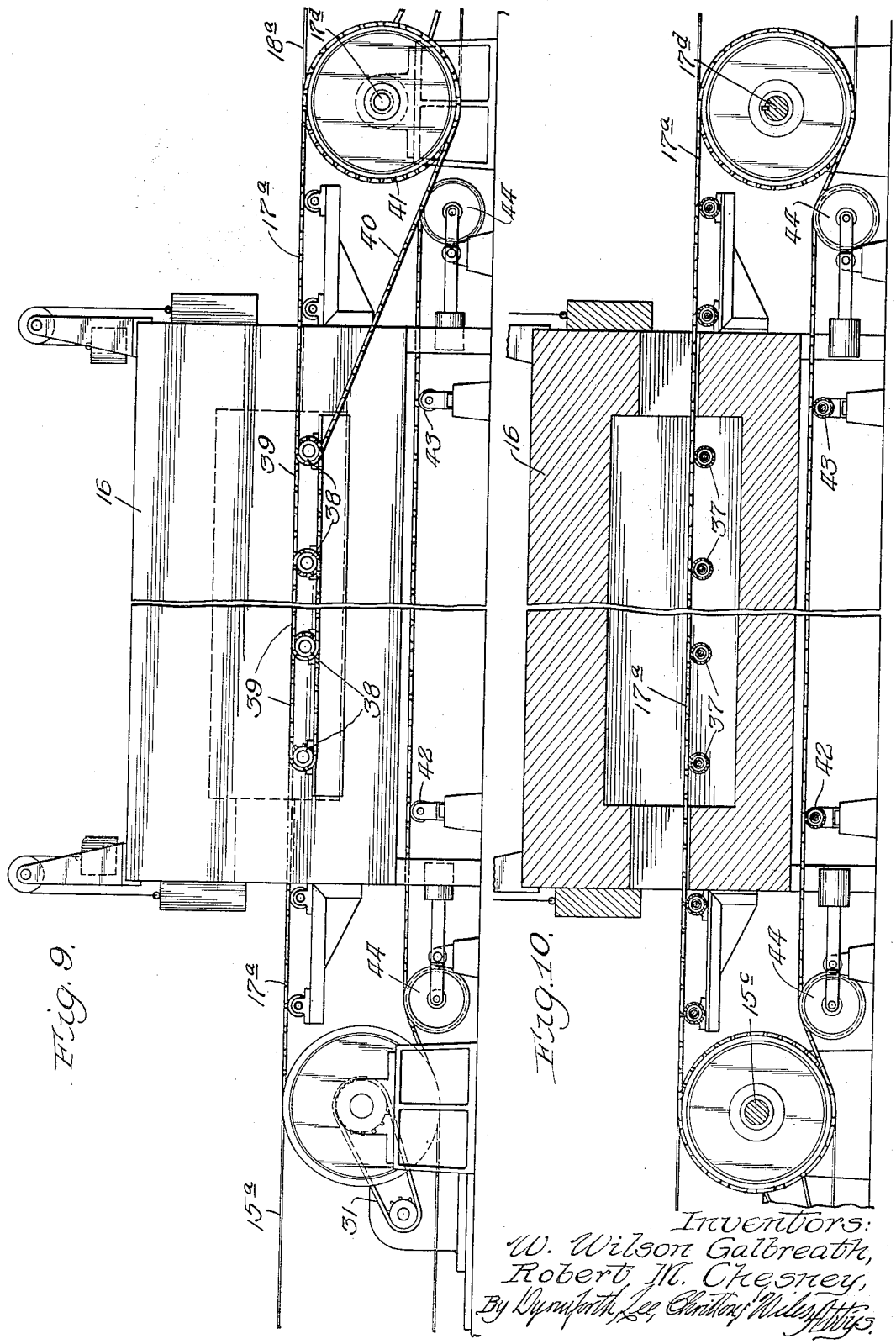

April 17, 1934.  W. W. GALBREATH ET AL  1,955,491
ENAMELING APPARATUS
Filed Feb. 18, 1932  6 Sheets-Sheet 6
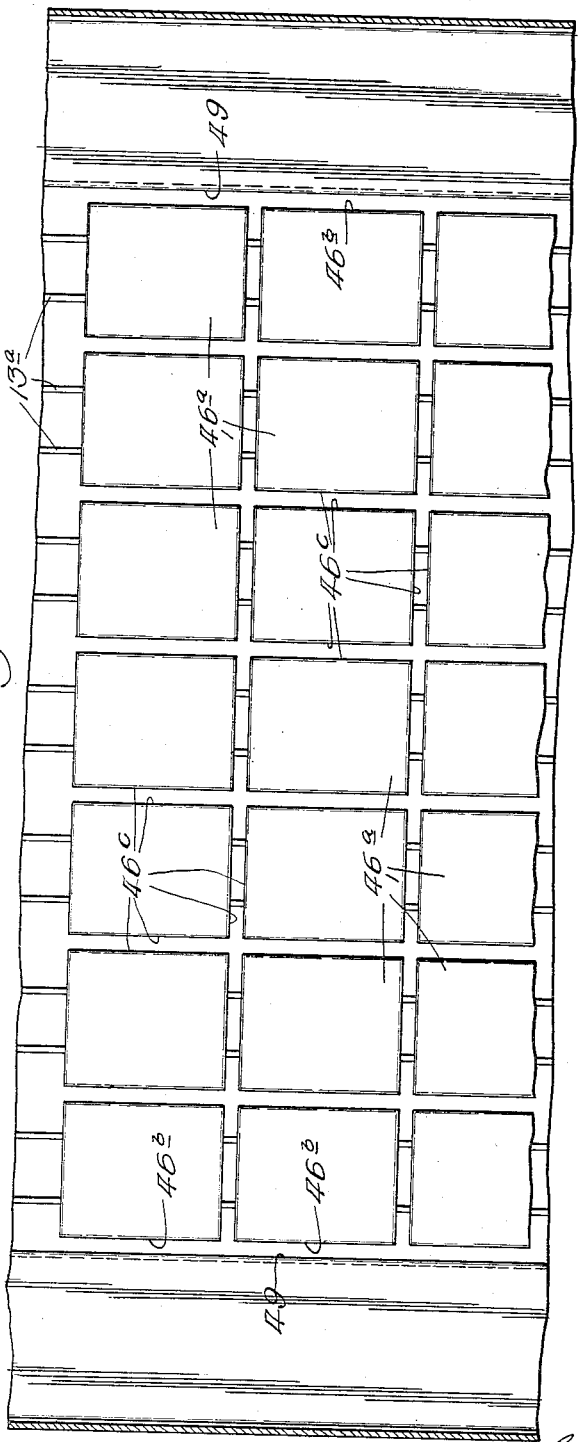
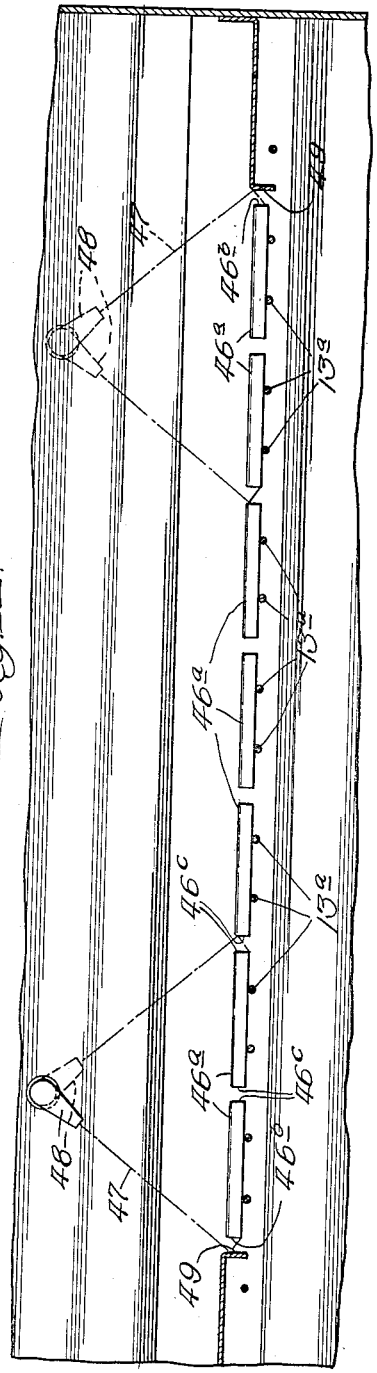
Inventors:
W. Wilson Galbreath,
Robert M. Chesney,
By Dynrenforth, Lee, Chritton; Wiles, Attys.

Patented Apr. 17, 1934

1,955,491

UNITED STATES PATENT OFFICE 1,955,491

ENAMELING APPARATUS

William Wilson Galbreath and Robert M. Chesney, Warren, Ohio, assignors to The Youngstown Pressed Steel Company, Warren, Ohio, a corporation of Ohio Application February 18, 1932, Serial No. 593,902

2 Claims. (Cl. 91—44)

This invention relates to improvements in enameling apparatus and, more especially, such apparatus including a conveyor or conveyors in combination with spraying, drying and firing or baking apparatus.

Our invention is particularly applicable to the covering of flat articles, such as sheet metal tiles, with vitreous or baked enamel. In apparatus of this kind the enamel is sprayed on the article in a liquid condition. During this spraying operation, the articles must be supported on some kind of conveyor which will not itself gather too much of the excess enamel that does not reach the articles to be covered. Some means must also be provided for removing the excess enamel that does lodge on the conveyor. Because of this condition, it is advisable to use endless parallel wires on supporting drums to form the conveyor to carry the articles through the spraying apparatus. Wires will not themselves gather a great amount of the enamel and they also can be rather easily cleaned. Such wires must be rather small and flexible in order to give good service. Wires of this kind, however, will not stand the extreme heat of a furnace. Consequently, it is necessary to provide another conveyor to carry the articles through the furnace. Before the firing or baking operation, however, it is desirable to carry the articles through a drier. It is not advisable to use the small wires for the drier conveyor. Among the features of our invention is the provision of a plurality of conveyors, each particularly adapted for the use to which it is put with means for driving said conveyors and shifting the articles from one conveyor to the other.

Other features and advantages of our invention will appear more fully as we proceed with our specification.

In that form of device embodying the features of our invention shown in the accompanying drawings:—

Figures 1ª, 1ᵇ and 1ᶜ together constitute a top plan view; Fig. 2 is a fragmentary view in side elevation, partly in section, showing portions of the spray, drier and furnace conveyors, the view being taken as indicated by the line 2 of Fig. 3; Fig. 3 is a view taken as indicated by the line 3 of Fig. 2; Fig. 4 is a view similar to Fig. 2, showing other portions of the conveyors; Fig. 5 is a view taken as indicated by the line 5 of Fig. 4; Fig. 6 is a fragmentary top plan view on an enlarged scale of the furnace and furnace conveyor; Figs. 7 and 8 are detail views of the chains used in the furnace conveyor; Fig. 9 is a view in side elevation of the furnace and conveyor; Fig. 10 is a similar view in vertical section; Fig. 11 is a top plan view on an enlarged scale of a portion of the spray conveyor; and Fig. 12 is a vertical sectional view of the same, showing the articles being sprayed.

It will aid in an understanding of the invention to give a general description of the apparatus first. The complete apparatus is shown, to a large extent diagrammatically, in Figs. 1ª, 1ᵇ and 1ᶜ. As here shown, 10 indicates, in general, a loading device in which the articles to be enameled are placed to start them on the conveyors. This device also includes spacing apparatus forming the subject-matter of a separate application. Numerals 11 and 12 indicate spray booths in which the articles are sprayed with liquid enamel. Numeral 13 indicates a wire conveyor carrying the articles through the spray booths. Numeral 14 indicates a drier through which the articles are carried by a cable conveyor 15. 16 indicates a furnace through which the articles are carried by a chain conveyor 17. Numeral 18 indicates a cooling conveyor made of cables. Numerals 19, 20 and 21 indicate more spray booths through which the articles are carried by the wire conveyor 22. Numeral 23 indicates another drier through which the articles are carried by a cable conveyor 24. From the drier 23 the articles are carried by a chain conveyor 25 through another furnace 26. Numeral 27 indicates a last cooling conveyor of cables. Numeral 28 indicates a device between the sprayers 11 and 12 for turning over the articles on the wire conveyor. This turn-over apparatus forms the subject-matter of a separate application.

It is to be understood that each of the wire conveyors includes a plurality of parallel wires on which the articles rest. Similarly, the cable conveyors include a plurality of parallel cables and the chain conveyors, a plurality of chains similarly arranged.

Portions of the wire conveyor 13, cable conveyor 15 and chain conveyor 17 are shown in Figs. 2 and 3. Portions of the chain conveyor 17 and cooling conveyor 18 are shown in Figs. 4 and 5. These will be described in detail. Since the wire, cable and chain conveyors 22, 24 and 25, respectively, and the cooling conveyor 27 are substantially the same, these latter need not be described in detail.

As shown in Figs. 2 and 3, the wire conveyor 13 includes a plurality of parallel endless wires 13ª on supporting drums 13ᵇ and 13ᶜ. The cable conveyor 15 includes a plurality of endless parallel cables 15ª. These are carried at the forward end by the drum 13ᶜ between the wires 13ª. At the rear end of the conveyor 15, the cables 15ª are supported upon driven pulleys 15ᵇ keyed on the shaft 15ᶜ. The shaft 15ᶜ is adapted to be driven by the motor 30 through the driving chain 31. Drive from the motor 30 is thus transmitted to the shaft 15ᶜ which drives the pulleys 15ᵇ, thus driving the cable conveyor 15. The cables 15ª drive the drum 13c and this drives the wire conveyor 13.

Loosely mounted on the shaft 15c between the driven pulleys 15b are idler wheels 17b carrying the endless chains 17a comprising the chain conveyor 17. At the rear end of the conveyor 17 the chains 17a are carried on the driven pulleys or sprockets 17c keyed on the shaft 17d. The shaft 17d is driven by the motor 32 through the chain 33. This motor 32, therefore, drives the chain conveyor 17 which carries the articles through the furnace 16.

Loosely mounted on the shaft 17d between the pulleys or sprockets 17c are a plurality of idler wheels 18b carrying the cables 18a of the cable conveyor 18. The idlers 18b may be mounted on the shaft 17d by the use of roller bearings 34 to lessen the friction. At the rear end of the conveyor 18 the cables 18a are supported on a drum 18c similar to the drum 13c above described. It is to be understood that this same drum 18c supports the endless wires of the spray conveyor 22 at the forward end of said conveyor. At the rear end, the wires of the conveyor 22 are supported on a similar drum 22c, said drum supporting the cables of the cable conveyor 24. At the rear end of the cable conveyor 24 said cables are supported upon driven wheels similar to the wheels 15b above described. The motor 35 serves to drive the conveyors 24, 22 and 18. The chain conveyor 25 is driven by the motor 36 which also drives the cable cooling conveyor 27. It will be sufficient to describe in detail only the conveyors 13, 15, 17 and 18, together with their driving and other associated mechanisms, since the conveyors following these are similar in construction and operation.

Summarizing, it may be helpful to state that the motor 30 drives the loading apparatus 10 and the conveyors 13 and 14. The motor 32 drives only the furnace conveyor 17. The motor 35 drives the conveyors 18, 22 and 24. The motor 36 drives only the furnace conveyor 25 and the cooling conveyor 27.

Figs. 6 to 10 illustrate in detail the furnace conveyor including the chains 17a for carrying articles through the furnace 16. It is to be understood, however, that these views would substantially equally as well illustrate the conveyor 25 and furnace 26. Inside of the furnace 16 the chains 17a are supported on driven rollers 37. These rollers are driven so that their peripheral speed is substantially the same as the speed of the chains 17a resting upon them. Any suitable driving means may be employed. For example, the ends of the shaft supporting the rollers 37 may be supplied with sprockets 38 connected by interconnecting chains 39. One of the sprockets 38 may be driven by a chain 40 from a sprocket 41 on the shaft 17d. Under the furnace 16 the return reaches of the chains 17a are supported on idlers 42 and 43. Numeral 44 indicates a counterbalanced idler to take up the slack in the chains 17a.

Means are provided for cleaning the wires 13a after the articles have been sprayed. Such means may include brushes 45, as shown in Fig. 2. Similar brushes (not shown) may be provided for cleaning the wires of the conveyor 22.

Each of the spray booths 11, 12, 19, 20 and 21 may include jets or nozzles for spraying liquid enamel upon the articles carried on the wire conveyor. Such apparatus is shown in Figs. 11 and 12 where the wires 13a of the wire conveyor 13 are shown supporting flat sheet metal tiles, or similar articles, 46a. As here shown, such tiles are provided, in a well-known manner, with depending marginal flanges 46c. The articles 46a are ordinarily arranged on the conveyor close enough together so that the liquid enamel 47 being sprayed from the jets or nozzles 48 will be reflected or deflected from the outside surface of the marginal flange 46c of one article against such surface of an adjacent article. In this way, all the outer surfaces of the flanges will be covered, with the exception of the outer edges 46b of the articles at the extreme edge of the conveyor. In order to cover these, we provide a stationary baffle or reflecting plate 49 at the side of the conveyor close to the outer row of articles 46a. Some of the material issuing from the jet 48 will strike this baffle-plate 49 and be reflected or deflected against the edges 46b of the outer row of tiles to cover the same.

One of the particular features of the invention is the construction of the chains 17a and 25a forming the chain conveyors extending through the furnaces 16 and 26. These chains are made of heat-resistant metal. The links 17e are cut out of sheet metal and placed on edge. These links are joined by the pivot pins 17g and have portions cut out, as indicated by 17f, in order to save weight. The portions cut out are so proportioned that the effective cross-section of the link at each point is substantially the same. That is, the links have substantially uniform strength throughout their lengths. The supporting rollers 37 aid in carrying the weight of the chains through the furnace where they are exposed to the greatest heat. It will be seen that each of the links of the chain is somewhat weakened because of the hole formed for the pivot. The portion 17f cut out, therefore, does not substantially decrease the strength of the link.

While we have shown and described certain embodiments of our invention, it is to be understood that it is capable of many modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

What we regard as new, and desire to secure by Letters Patent, is:

1. Apparatus of the character described, including; a conveyor formed of substantially parallel horizontal wires adapted to support articles to be sprayed; means above said conveyor for spraying liquid enamel onto articles supported on said conveyor; and a baffle-plate adjacent the side of said conveyor adapted to direct sprayed enamel against the outer edges of articles on said conveyor.

2. Apparatus of the character described, including; a conveyor formed of substantially parallel horizontal wires adapted to support articles to be sprayed; means for spacing articles on said conveyor with their adjacent edges somewhat separated; means above said conveyor for spraying liquid enamel onto articles supported on said conveyor, said spraying means adapted to direct liquid in a slanting direction against one edge of an article on said conveyor; and a stationary baffle adapted to direct some of said liquid against the edge of an adjacent moving article.

W. WILSON GALBREATH.
ROBERT M. CHESNEY.